US012643525B2

(12) United States Patent
Huber et al.

(10) Patent No.: US 12,643,525 B2
(45) Date of Patent: Jun. 2, 2026

(54) MEASURING RIM FOR COLLECTING ABRADED BRAKE PARTICLES

(71) Applicant: AVL LIST GMBH, Graz (AT)

(72) Inventors: Michael Peter Huber, Graz (AT); Peter Fischer, Garsten (AT); Martin Kupper, Graz (AT); Andreas Klug, Semriach (AT)

(73) Assignee: AVL LIST GMBH, Graz (AT)

( * ) Notice: Subject to any disclaimer, the term of this patent is extended or adjusted under 35 U.S.C. 154(b) by 162 days.

(21) Appl. No.: 18/274,570

(22) PCT Filed: Jan. 28, 2022

(86) PCT No.: PCT/AT2022/060026
§ 371 (c)(1),
(2) Date: Jul. 27, 2023

(87) PCT Pub. No.: WO2022/160000
PCT Pub. Date: Aug. 4, 2022

(65) Prior Publication Data
US 2024/0116486 A1 Apr. 11, 2024

(30) Foreign Application Priority Data

Jan. 29, 2021 (AT) .............................. A 50053/2021

(51) Int. Cl.
*F16D 65/00* (2006.01)
*B60T 17/22* (2006.01)
(52) U.S. Cl.
CPC .......... B60T 17/22 (2013.01); F16D 65/0031 (2013.01)
(58) Field of Classification Search
CPC .... B60T 17/22; B60T 17/221; F16D 65/0031; G01L 5/28

(Continued)

(56) References Cited

U.S. PATENT DOCUMENTS

2008/0029357 A1* 2/2008 Krantz ................ B60L 15/2036
219/202
2014/0054120 A1 2/2014 Hummel et al.
(Continued)

FOREIGN PATENT DOCUMENTS

CN 101949420 A 1/2011
CN 112219040 A 1/2021
(Continued)

OTHER PUBLICATIONS

Kukutschová J., et al., "On airborne nano/micro-sized wear particles released from low-metallic automotive prakes," Environmental Pollution 159 (2011), S.998-1006, doi: 10.1016/j.envpol.2010.11. 036.

*Primary Examiner* — Robert R Raevis
(74) *Attorney, Agent, or Firm* — Dykema Gossett PLLC

(57) ABSTRACT

The aim of the invention is to allow a reliable quantification and classification of brake abrasion of a brake system of a vehicle and simultaneously reduce the complexity in a practical application. This is achieved by a measuring rim with a rim interior, in which a collecting housing is arranged that extends in the circumferential direction of the measuring rim over an extension angle ($\alpha$). A collecting housing interior is formed in the collecting housing, and the collecting housing is at least partly open towards the collecting housing interior on a radially inner circumferential surface extending in the circumferential direction of the measuring rim. A discharge area is provided on the rim flange on the measuring rim, and a collecting channel which connects the collecting housing interior of the collecting housing to the discharge area is provided on the measuring rim.

16 Claims, 9 Drawing Sheets

(58) Field of Classification Search
USPC .......... 96/413; 340/438, 453, 454; 73/28.01,
73/121, 128, 129, 863.23, 863.83, 864.34,
73/864.73, 864, 81, 865.5, 865.8
See application file for complete search history.

(56) References Cited

U.S. PATENT DOCUMENTS

| | | | |
|---|---|---|---|
| 2015/0122601 A1 | 5/2015 | Rocca-Serra | |
| 2017/0248180 A1 | 8/2017 | Metayer | |

FOREIGN PATENT DOCUMENTS

| | | | | |
|---|---|---|---|---|
| DE | 202008009177 U1 | 11/2009 | | |
| DE | 202008009717 U1 | 11/2009 | | |
| DE | 102012022886 A1 | 10/2013 | | |
| DE | 102016124121 A1 | 6/2018 | | |
| DE | 102017200941 A1 | 7/2018 | | |
| DE | 102017006349 A1 | 1/2019 | | |
| DE | 102017200941 B4 | * 5/2019 | ............. | G01N 15/02 |
| DE | 102019133772 A1 | * 6/2021 | ........ | F16D 65/0031 |
| FR | 2815099 A1 | 4/2002 | | |
| KR | 101511663 B1 | 4/2015 | | |
| WO | 2011160976 A1 | 12/2011 | | |
| WO | 2017097901 A1 | 6/2017 | | |
| WO | 2019048377 A1 | 3/2019 | | |
| WO | 2021008887 A1 | 1/2021 | | |
| WO | WO-2024013495 A1 | * 1/2024 | ............. | B60R 11/00 |

* cited by examiner

MEASURING RIM FOR COLLECTING ABRADED BRAKE PARTICLES

CROSS-REFERENCE TO RELATED APPLICATION

This application is a national stage filing based upon International application No. PCT/AT2022/060026, filed 28 Jan. 2022, which claims the benefit of priority to Austria application No. A50053/2021, filed 29 Jan. 2021.

BRIEF SUMMARY

The present invention relates to a measuring rim having a rim circumferential surface which is connected at least on one rim end face of the measuring rim via one or more spokes to a centrally inwardly positioned rim flange, wherein a rim interior is formed between the rim circumferential surface, the spokes and the rim flange. The invention also relates to an arrangement for detecting the brake abrasion of a brake device of a vehicle wheel, the vehicle wheel having a measuring rim described at the beginning.

BACKGROUND

The environmental pollution caused by particulate matter from vehicles has been known for a long time and is subject to ever stricter legal regulations. So far, the focus has mainly been on the particulate matter pollution which is generated by the combustion process in an internal combustion engine and released into the environment via the exhaust gases. In the meantime, however, other sources of particulate matter in a vehicle have also been identified. In particular, the brake system of a vehicle has come into focus in this case. The abrasion of the brake disk and the brake pads during the operation of the vehicle produces particulate matter which gets into the environment and is partly responsible for the particulate matter pollution in the air.

Therefore, particle filters for brake abrasion have already become known, which partially surround the brake disk and are arranged in the direction of rotation after the brake, in order to collect and filter the brake abrasion during braking while the vehicle is in operation. An example of this is described in WO 2019/0048377 A1. Such particle filters for brake abrasion are also described to have active suction, for example in WO 2011/1160976 A1.

The manufacturers of vehicles or brake systems are also increasingly focusing on reducing the generation of particulate matter by the brake system. In order to develop a brake system, brake test stands, on which the brake system is set up and subjected to dynamic tests, are often used. In order to be able to better assess the origin and the extent of particulate matter generation due to abrasion of the brake disk/brake pads, expanding such brake test stands in order to be able to measure the brake abrasion is already known. An example of this is WO 2017/097901 A1. This problem has also already been addressed in specialist literature, for example in Kukutschova J., et al., "On airborne nano/micro-sized wear particles released from low-metallic automotive brakes," Environmental Pollution 159 (2011), S. 998-1006. The brake disk and the brake pad are substantially housed on the brake test stand and the air in the housing is sucked out and analyzed. Since the particles formed during the braking process are highly temperature-dependent from a certain threshold temperature on, the process control, in particular the air volume flow in the housing which additionally cools the entire system, has an impact on particle emissions. This can hinder realistic measuring of the brake abrasion.

However, a brake test stand can only approximate real use in a vehicle on the road. For more realistic assessments, it is therefore always interesting to carry out measurements on the real vehicle while it is in operation on the road. DE 10 2017 006 349 A1, for example, shows an apparatus for measuring and classifying the particle emissions of a wheel brake of a vehicle during real operation on the road, wherein this apparatus could also be used on a brake test stand. Here, the brake having the brake disk and the brake shoes are enclosed in a housing on the vehicle. Air is supplied into the housing and the particle-laden air is removed from the housing and supplied to a measuring system. The difficulty here is that a separate housing has to be produced for each vehicle, each wheel and each brake. In order to be able to accommodate the housing in the wheel well, it may be necessary to lengthen the wheel axle. Apart from that, the supply air and exhaust air must be guided in the wheel well, in which there is already little space and which is difficult to access. The underbody of the vehicle is therefore often drilled through in order to be able to guide the supply air and exhaust air to the brakes. This apparatus is therefore expensive to use in practice. In addition, it should be noted that the system temperature is influenced by the actively supplied air, which can affect the measurement and its results due to the pronounced temperature dependence of brake abrasion.

DE 10 2017 200 941 B4 describes an apparatus for measuring brake particle emissions, in which apparatus a dust collecting funnel is attached to the outer ring of the wheel rim and surrounds the entire outer face of the rim and rotates with the rim. Particle-laden air is sucked out via the dust collecting funnel and supplied to a particle measurement. The wheel rim is not sealed on the inside of the rim, which means that it is not possible to separate the brake abrasion from the tire or road abrasion or ambient dust in the particle-laden exhaust air. This prevents reliable quantification and classification of brake abrasion. Apart from that, in this apparatus, the flow conditions change with the geometric shape of the measured wheel rim, which is why a comparison of the brake abrasion between different vehicles or wheel rims is hardly possible. After all, the dust collection funnel and the lack of air circulation can also cause overheating inside the rim, which can affect the particle emission measurement because the particle emission is greatly dependent on the temperature.

In any event, a partial closure of the rim, as in DE 10 2017 006 349 A1 or DE 10 2017 200 941 B4, affects the conditions otherwise prevailing in the rim, in particular in the area of the brake. Hence, particle emission caused by brake abrasion, as detected and measured in this way, can deviate from real brake abrasion, which puts into question the reliability of the measurement.

SUMMARY OF THE INVENTION

The object of the present invention is that of making a reliable quantification and classification of the brake abrasion of a brake system of a vehicle possible and at the same time of reducing the outlay in practical use.

This object is achieved according to the invention by a measuring rim mentioned at the beginning in that a collecting housing, which extends in the circumferential direction of the measuring rim over an extension angle, is arranged in the rim interior, a collecting housing interior is formed in the collecting housing and the collecting housing is at least partly open towards the collecting housing interior on a radially inner circumferential surface extending in the circumferential direction of the measuring rim, a discharge area is provided on the rim flange on the measuring rim, and a collecting channel which connects the collecting housing interior of the collecting housing to the discharge area is provided on the measuring rim. The impact of collecting the brake abrasion can be largely reduced with such a collecting housing. In particular, neither the usual cooling of the brake system and thus the temperature in the area of the brake system nor the flow in the area of the brake system are excessively affected by this, so that the collected brake particles are realistic. This requires either no adaptation of a standard rim at all, or only minor adaptations, so that the effort for implementing the collection of the brake abrasion is minimal.

The extension angle is favorably between 100° and 180°. Preferably, the extension angle is between 100° and 130°.

It is advantageous if an end of the collecting channel facing away from the collecting housing interior extends for a predetermined length in the circumferential direction of the collecting housing. Thus, the design and dimensioning of the collecting channel can have a specific influence on the collection of the brake abrasion, and the control of the brake abrasion, in particular in order to minimize particle losses, can be specifically designed. It is also conceivable here that the cross section of the collecting channel changes in the circumferential direction, in particular decreases in the direction of rotation in order to reduce particle loss. The rest of the circumference adjoining the collecting channel can be closed along the circumference in order to prevent particle losses.

It is particularly advantageous to use a central recess, which is formed centrally on the inside of the rim flange, as a discharge area. In other words, a central recess which forms the discharge area is provided centrally on the inside of the rim flange. Such a central recess is present in each standard rim and provides space for removing the brake abrasion that has been collected.

To this end, at least one radial recess can be provided on the rim flange, which connects the rim interior to the central recess in that the radial recess on the radially outer circumferential surface of the rim flange opens out into the region of the rim flange, which projects into the rim interior, and opens out radially inside into the central recess, and that the collecting channel ends on the outer circumferential surface of the rim flange in the region of the opening of the at least one radial recess in order to connect the discharge area to the collecting housing interior. For this purpose, only the radial recesses on the rim flange are to be provided on the measuring rim, which can be realized with little effort.

Adapting a standard rim can be omitted if a collecting disk is arranged on an axial end of the rim flange, which axial end lies in the rim interior, or on the outside of the rim end face, in which collecting disk a cavity is provided and the cavity forms the discharge area, at least partly, and the cavity is connected to the collecting channel. It is structurally simple if at least one opening towards the cavity is provided on the collecting disk on a radially outer circumferential surface and/or at an end face, and if the collecting channel ends in the region of the at least one opening in order to connect the cavity to the collecting housing interior.

It is more advantageous and structurally simple, if the collecting disk has a first collecting disk plate and a second collecting disk plate, which are arranged axially spaced apart from one another to form the cavity, wherein a centrally inwardly positioned recess is provided on the first collecting disk plate, which recess is connected to the cavity. It is advantageous if the recess of the first collecting disk plate is arranged in the central recess of the measuring rim, because then the brake abrasion can be discharged again via the central recess. Alternatively, at least one connecting channel is arranged on the collecting disk, which connecting channel is connected to the cavity, wherein the connecting channel opens out into a circumferential groove of a connecting ring and the collecting channel ends in the region of the circumferential groove in order to connect the cavity to the collecting housing interior via the connecting channel and the connecting ring. This embodiment also makes it possible, in particular, to arrange the collecting disk on the rim end face, whereby a lane broadening on the axle can be avoided by a collecting disk on the inner rim side.

A rotary feedthrough connected to the discharge area is advantageously provided on the measuring rim in order to discharge the brake abrasion from the measuring rim. This can be implemented in a particularly simple manner if a hollow discharge nozzle is rotatably mounted in the central recess as a rotary feedthrough.

A measuring rim according to the invention is advantageously used for detecting the brake abrasion of a brake device of a vehicle wheel, wherein the collecting housing of the measuring rim at least partly surrounds a movable brake part of the brake device rotating with the vehicle wheel, in that the movable brake part projects into the collecting housing interior. The collecting housing can simply be put through the opening on the radially inner circumferential surface and over a movable brake part, e.g., a brake disk, as a result of which the measuring rim is easy to use.

The object of the invention is also achieved by an arrangement mentioned in the beginning for detecting the brake abrasion of a brake device of a vehicle wheel, wherein the vehicle wheel has a measuring rim described above and the collecting housing of the measuring rim at least partly surrounds a movable brake part of the brake device, in which the movable brake part projects into the collecting housing interior.

Preferably, the brake abrasion is guided out of the discharge area via a discharge line to a measuring device.

In a further variant, a filter insert in which brake abrasion is collected is arranged in the discharge area or in a central recess connected to the discharge area.

BRIEF DESCRIPTION OF THE DRAWINGS

The present invention is described in greater detail below with reference to FIGS. 1 to 14, which show schematic and non-limiting advantageous embodiments of the invention by way of example. In the figures.

DETAILED DESCRIPTION

Figure 1:
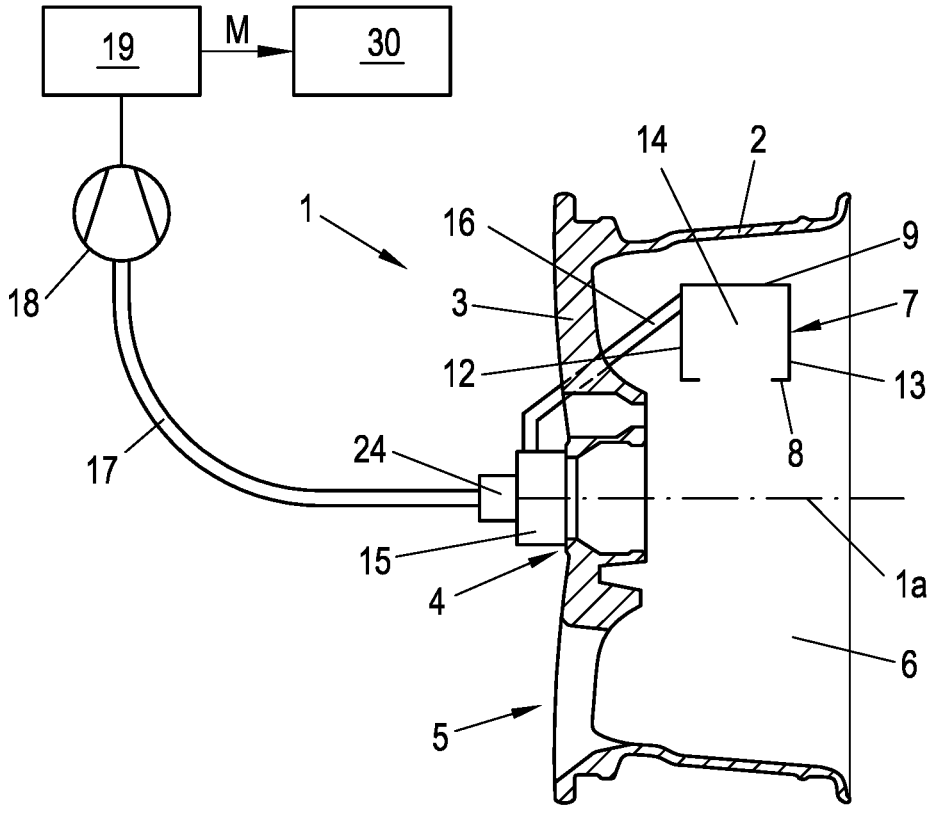
FIGS. 1 and 2 show a measuring rim according to the invention in different views.
Figure 2:
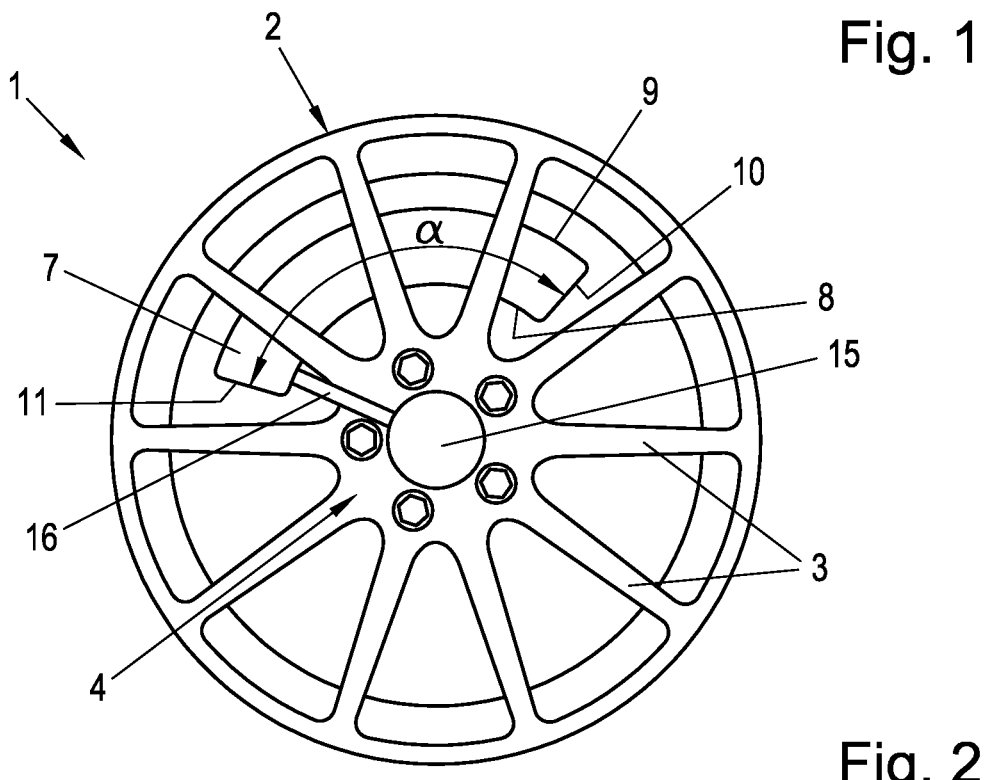

FIG. 1 (sectional view) and FIG. 2 (side view) show a measuring rim 1 according to the invention with an axis of rotation 1*a*. The measuring rim 1 together with a tire (not shown) is suited to be mounted as a vehicle wheel on a vehicle, the vehicle wheel and the measuring rim 1 rotate correspondingly about the axis of rotation 1*a* when this vehicle is moved. The measuring rim 1 consists of a radially outer rim circumferential surface 2 relative to the axis of rotation 1*a* which serves as a tire bearing surface for forming a vehicle wheel, a number of spokes 3, and a centrally inwardly positioned rim flange 4. The rim flange 4 is directly adjacent to the axis of rotation 1*a*. The spokes 3—at least one or, as in the exemplary embodiment shown, multiple spokes are provided—connect, in a known manner, the rim flange 4 to the rim circumferential surface 2 at a rim end face 5 (which during intended use of the measuring rim 1 forms the outer face of the vehicle wheel). The measuring rim 1 is usually open on the end face opposite the rim end face 5 (during intended use of the measuring rim, the end face is oriented towards the wheel well of a vehicle). A rim interior 6 is thus formed between the rim circumferential surface 2, the spokes 3 and the rim flange 4. In particular, the rim interior 6 is formed between the inner side of the rim circumferential surface 2 facing the axis of rotation 1*a* and the surfaces of the spokes 3 and the rim flange 4 which are oriented in the direction of the wheel well when the measuring rim 1 is used as intended.

A collecting housing 7 is arranged in the rim interior 6 of the measuring rim 1 and extends in the circumferential direction of the measuring rim 1 over a predetermined extension angle α and forms a collecting housing interior 14. The circumferential direction of the measuring rim 1 extends around the axis of rotation 1*a*. The extension angle α is advantageously between 100 and 180°. The extension angle α is preferably smaller than 130° so that airflow in the area of the measuring rim 1 does not deviate too strongly from the conditions otherwise occurring on the vehicle, which could also negatively influence the cooling of the brake components.

When using a measuring rim 1 as intended, there is usually a wheel hub 23 arranged in the rim interior 6 for connecting the measuring rim 1 to a (driven or non-driven) axle 25 of a drive train of a vehicle and the brake device 20 (shown, for example, in FIG. 3), for example a known floating caliper disk brake with brake caliper 21 and brake disk 22). The measuring rim 1 can be used on all axle and wheel suspension variants, for example on a half-floating axle, a rigid axle, a half-floating rigid axle, a twist-beam axle, a single-wheel suspension, etc.

Figure 3:
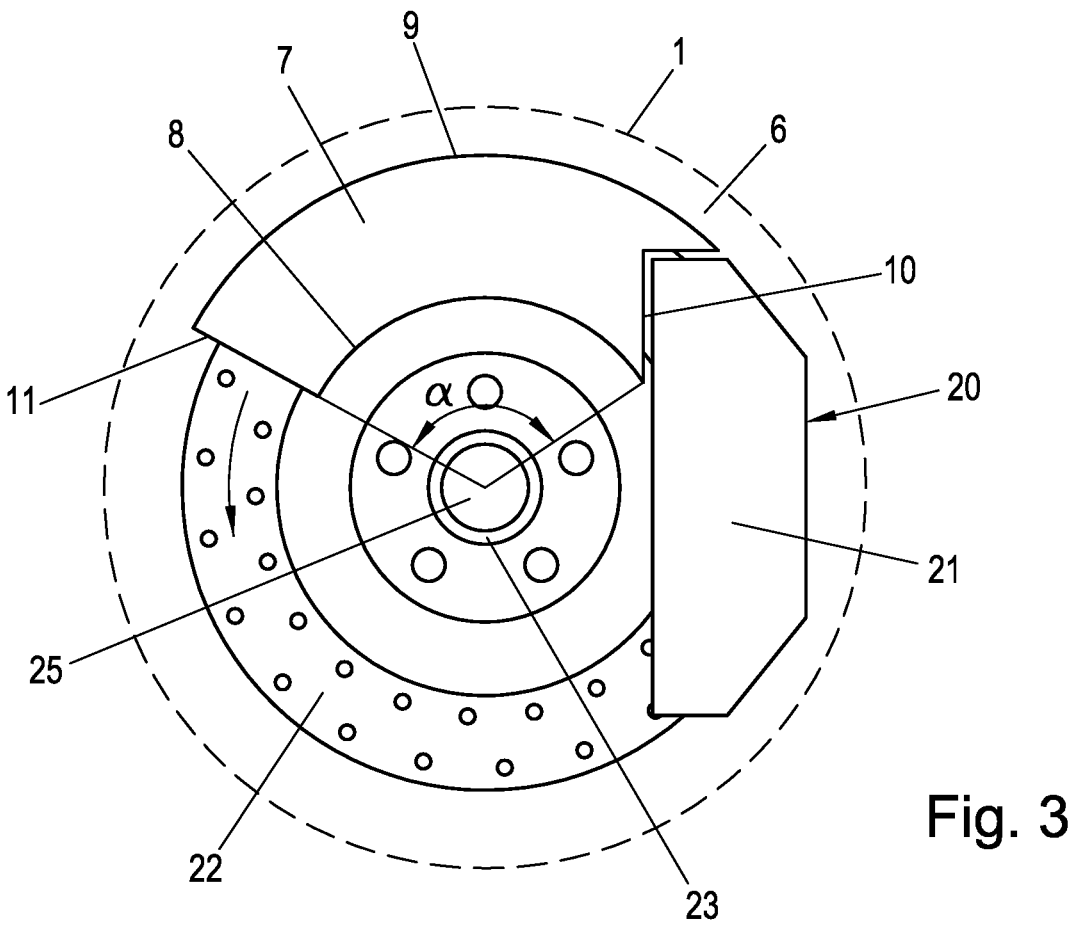
FIG. 3 shows the arrangement of the measuring rim according to the invention on a brake device.
Figure 4:
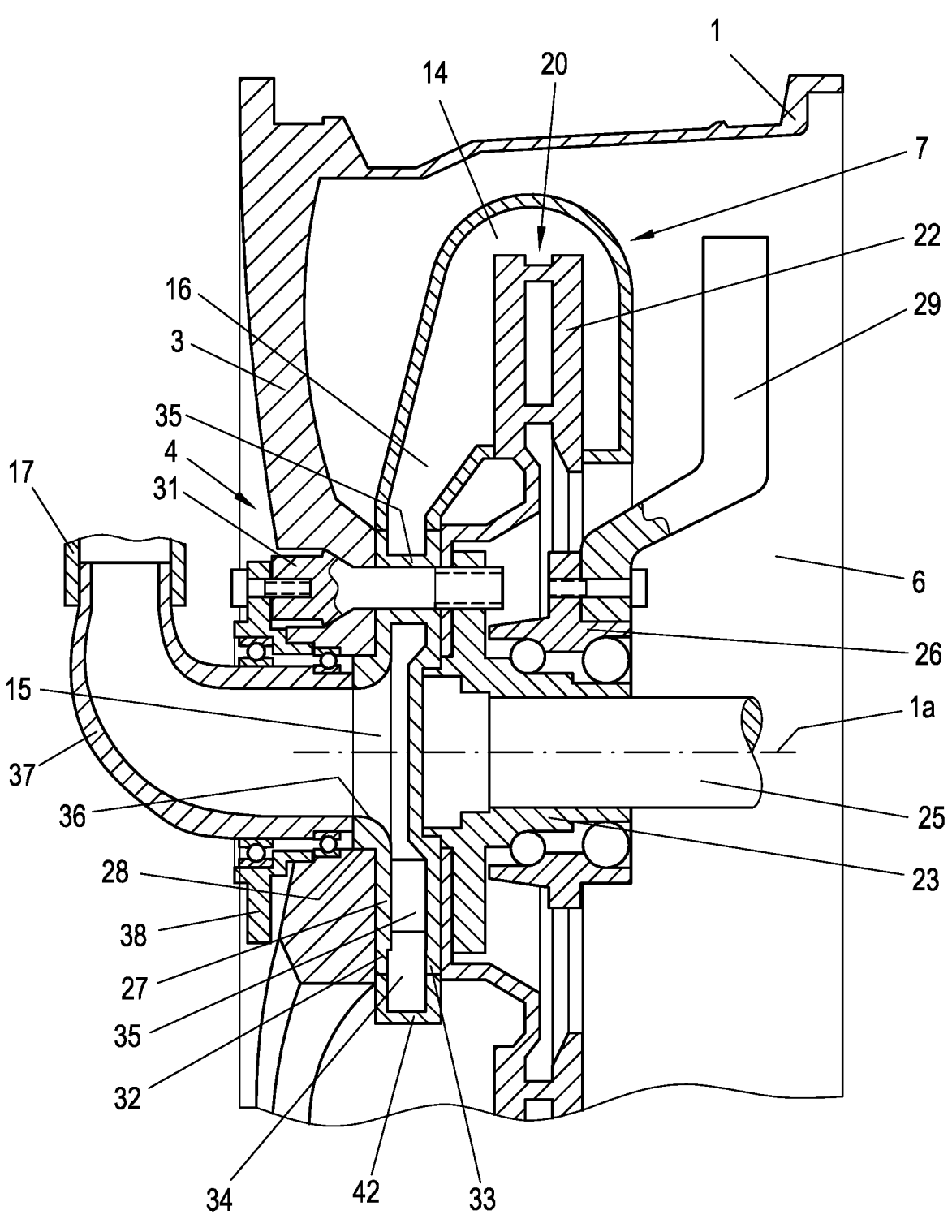

The measuring rim 1 is usually connected to the wheel hub 23 via the rim flange 4 by means of wheel screws 31 (usually wheel screws arranged such as to be distributed on a hole circle of the rim flange 4 over the circumference), which wheel hub is rotatably mounted by means of a wheel bearing 26 (e.g., FIG. 3 or FIG. 4). The wheel hub 23 is connected to the axle 25 via a shaft-hub connection, and the wheel bearing 26, specifically the rotationally fixed part of the wheel bearing 26, is arranged on a rotationally fixed component of the vehicle, for example a wheel carrier 29 of a wheel suspension. The moving part of the brake device, for example the brake disk 22, is also connected to the wheel hub 23 and thus rotates with the wheel hub 23.

The collecting housing 7 consists of an inner circumferential housing surface 8 extending in the circumferential direction of the measuring rim 1, an outer circumferential housing surface 9 extending in the circumferential direction of the measuring rim 1, housing side surfaces 12, 13 and housing end faces 10, 11, which together form the limitation of the collecting housing interior 14 of the collecting housing 7. The circumferential housing surfaces 8, 9 are connected to one another by the two housing side surfaces 12, 13 and the two housing end faces 10, 11 which form the ends of the collecting housing 7 lying in the circumferential direction. The housing end faces 10, 11 also define the extension angle α. At least one housing end face 10, 11 is preferably designed to be at least partially open. The inner circumferential housing surface 8 is also preferably designed to be at least partially open.

A discharge area 15 is provided on the rim flange 4 on the measuring rim 1. The discharge area 15 can be formed integrally with the rim flange 4 or can be connected integrally with the rim flange 4. The discharge area 15 is connected to the collecting housing interior 14 via a collecting channel 16. The collecting channel 16 produces a fluid connection between the collecting housing interior 14 and the discharge area 15.

After the measuring rim 1 rotates during operation, a suitable rotary feedthrough 24 can be provided which is connected with the discharge area 15. Such rotary feedthroughs are well known. The rotary feedthrough 24 serves for transferring the brake abrasion from the rotating discharge area 15 into a discharge line 17 which is rotationally fixed with respect to the discharge area 15.

The measuring rim 1 is used for collecting brake abrasion of a brake device 20, for example a service brake of a vehicle, for example in the form of a floating caliper disk brake with a brake disk 22 and a brake caliper 21 with brake pads, which are pressed against the brake disk 22 for braking. This is shown, for example, in FIG. 3, wherein for reasons of clarity only the collecting housing 7 of the measuring rim 1 is shown. The measuring rim 1 can be used on a test bench or during real vehicle operation on a traffic route, for example a road or a testing ground. When used on a traffic route during real vehicle operation or on a chassis dyno for a vehicle, the measuring rim 1 is of course part of a vehicle wheel with a vehicle tire on the measuring rim 1. When used on a drive train dyno or brake dyno, a vehicle tire does not necessarily have to be arranged on the measuring rim 1.

The collecting housing 7 serves for collecting brake abrasion of the brake device 20 in the collecting housing interior 14. The brake abrasion, in the form of solid and/or volatile brake particles of the stationary and/or moved brake part, is present as aerosols in the collecting housing interior 14. The aerosol is essentially air loaded with brake particles. The collected particle-loaded volume flow is passed through the collecting channel 16 to the discharge area 15, from where the brake abrasion is guided via a discharge line 17 to a measuring device 19. A discharge pump 18 can be arranged in the discharge line 17 in order to suction the brake abrasion from the collecting housing interior 14 via the collecting channel 16 and the discharge area 15 and to feed it to the measuring device 19. It can also be provided that a removal point for the removal of brake abrasion for the measuring device 19 be provided upstream of the pump 18. The collecting housing 7 is preferably arranged downstream of the brake device 20 in the direction of rotation (indicated by an arrow in FIG. 3), preferably after the brake device 20. The collecting housing 7 preferably surrounds the moved brake part, for example a brake disk 22, of the brake device 20 at least partially, i.e., the moved brake part is partially arranged in the collecting housing 7. The moved brake part usually rotates with the measuring rim 1 or a vehicle wheel with a measuring rim 1. Thus, through the rotation of the moved brake part, brake abrasion reaches the collecting housing interior 14 and can be discharged from there. In this way, there is little loss of brake abrasion.

Of course, a brake device 20 other than a floating caliper disk brake can be provided, for example a fixed caliper brake, a drum brake, etc. Although advantageous, the moved brake part, in particular a brake disk 22, does not necessarily have to be arranged at least partially in the collecting housing 7 if the brake abrasion can reach or is guided into the collecting housing 7 in some other way.

The measuring device 19 can be designed as desired, for example as a sufficiently known particle measuring device, and can detect arbitrary characteristics of the brake abrasion as measured variable M, for example a brake particle number, a brake particle size distribution, a brake particle mass, a brake particle composition, etc. Measuring devices for this purpose are sufficiently known and can operate, for example, according to the principle of condensation particle enlargement or according to the diffusion charge principle. Of course, several different measuring devices 19 can also be provided for detecting different characteristics of the brake abrasion.

If necessary, a known processing of the aerosol discharged from the collecting housing interior 14 can be provided upstream of the measuring device 19, for example a dilution of the aerosol stream with a particle-free gas, a branching of a defined measuring volume flow for measurement or a removal of volatile particles in the aerosol ("volatile particle remover"), wherein also multiple such processing steps can be provided. Temperature control, at least in sections, of the discharge line 17 and/or of a discharge pump 18 to a predetermined temperature is also possible. By means of the measuring device 19 the measured variable M can be determined either integrally (over a defined cycle, for example in the form of a measured variable over a certain period of time or a specific test drive with a vehicle) or in a time-resolved manner (preferably in predetermined time steps). The measuring device 19 can also send the determined measured variable M to an evaluation unit 20 (computer hardware and/or software) for evaluation or storage.

Advantageous embodiments of the measuring rim 1 are described below with reference to FIGS. 4 to 14. In the figures, the same parts are provided with the same reference numerals. For reasons of clarity, however, not all repeatedly occurring parts are provided with reference numerals in the figures.

FIG. 4 shows a measuring rim 1 according to the invention, which in this exemplary embodiment is arranged in the usual manner on a wheel carrier 29 of a vehicle (not shown). The wheel carrier 29 is, for example, part of a wheel suspension of the vehicle and forms a rotationally fixed component. The wheel bearing 26 or the rotationally fixed part of the wheel bearing 26 is arranged on the wheel carrier 29. For example, bearing screws (not shown) are provided in order to arrange the wheel bearing 26 on the wheel carrier 29 or on another rotationally fixed component of the vehicle. The wheel hub is 23 rotatably mounted on the wheel bearing 26. In the embodiment according to FIG. 4, the wheel hub 23 is executed as a rotatable part of the wheel bearing 26.

The wheel hub 23 can be connected to an axle 25, as shown in FIG. 4. A brake disk 22 is arranged as a movable brake part at the wheel hub 23, for example with suitable screw connections. The brake disk 22 thus rotates with the wheel hub 23. The measuring rim 1 is connected to the wheel hub 23 via wheel screws 31.

The collecting housing 7 of the measuring rim 1 is partly put over the brake disk 22 (see also FIG. 6) so that the brake disk 22 is partially arranged in the collecting housing 7. When the measuring rim 1 moves, the moved brake part of the brake system 20—here the brake disk 22—rotates in the collecting housing 7. The collecting housing 7 with the collecting channel 16 is arranged on a component of the vehicle which is rotationally fixed relative to the measuring rim 1, for example on the wheel carrier 29, on the rotationally fixed part of the wheel bearing 26 or on the rotationally fixed part of the brake device 20 (for example on a brake caliper), and thus does not rotate with the measuring rim 1. The collecting housing is arranged in the direction of rotation after the rotationally fixed part of the brake device 20 (here the brake caliper 21) (see FIG. 3).

A collecting disk 27 (shown in detail in FIG. 5) is arranged between the rim flange 4 and the wheel hub 23, for example via the wheel screws 31. The collecting disk 27 thus rests axially on the end of the rim flange 4 which lies inside the rim 6. In this embodiment, a standard rim which does not have to be adapted can be used. A cavity 34 is provided in the collecting disk 27 and forms the discharge area 15 of the measuring rim 1.

The collecting disk 27 may consist of a first collecting disk plate 32 and a second collecting disk plate 33 which are arranged such as to be axially spaced apart from one another. Connecting webs 35, through which wheel screws 31 are guided, can be provided for axial spacing.

Figures 6, 9:
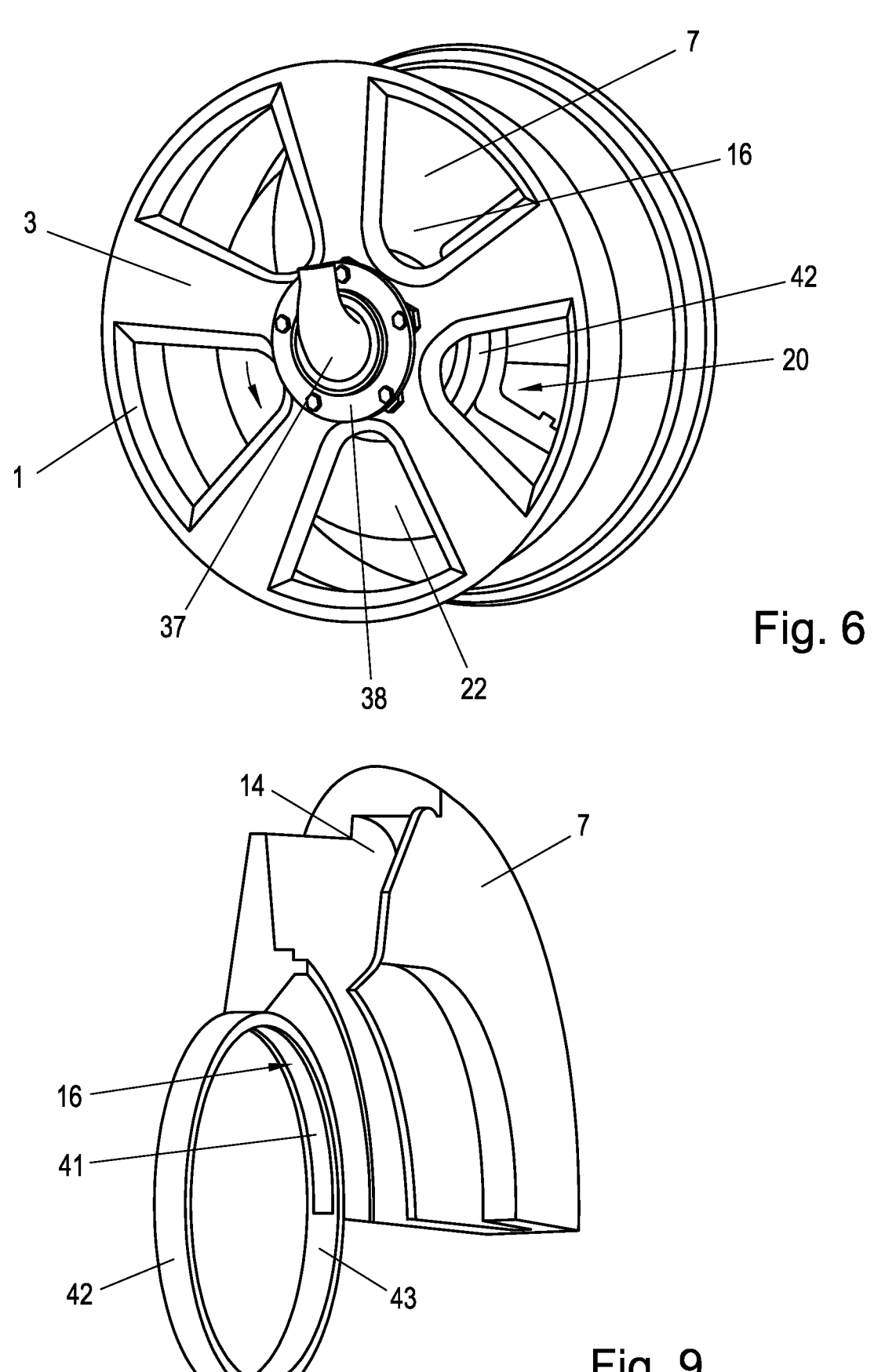
FIGS. 8 and 9 show a further embodiment of a measuring rim according to the invention.

The collecting disk 27 can be designed to be at least partially open at the outer circumferential surface, as a result of which the cavity 34 is connected to the outer circumferential surface. In this embodiment, the collecting channel 16 ends in the region of the outer circumferential surface of the collecting disk 27. Accordingly, the cavity 34 is formed between the first collecting disk plate 32 and the second collecting disk plate 33, which cavity 34 is connected to the collecting channel 16 via the outer circumferential surface of the collecting disk 27. The collecting channel 16 preferably extends in the circumferential direction across the outer circumference of the collecting disk 27 (as shown in FIGS. 4 and 6) and closes the collecting disk 27 to the outside on the circumference adjoining the collecting housing 7 in order to enable the brake abrasion to be discharged with as little loss as possible. The first collecting disk plate 32 is arranged such as to face the rim flange 4 and has a recess 36 in the central inner region. The collecting disk 27 with the cavity 34 thus forms the discharge area 15 of the measuring rim 1 which is accessible via the recess 36.

In an alternative embodiment, the collecting disk 27 is closed at the radially outer circumferential surface. In order to connect the collecting channel 16 with the cavity 34 of the collecting disk 27, at least one opening to the cavity 34, preferably several openings distributed across the circumference, can be provided at an axial end face of the collecting disk 27, for example, in the first collecting disk plate 32 or the second collecting disk plate 33. The collecting channel 16 would then lead in the region of these openings on the collecting disk 27. What is also conceivable is a combination of an at least partially open radially outer circumferential surface and at least one opening on an axial end face of the collecting disk 27. The collecting channel 16 must then be designed accordingly.

FIG. 4 shows also a possible connection of the discharge line 17 to the discharge area 15 for discharging the collected brake abrasion. The recess 36 of the collecting disk 27 is arranged in the central recess 28 of the measuring rim 1. A hollow discharge nozzle 37 is rotatably mounted in the central recess 28. For this purpose, a rotatable part of a nozzle bearing 38 can be attached to the measuring rim 1, and the discharge nozzle 37 can be connected to a part of the nozzle bearing 38 which is rotationally fixed relative to the measuring rim 1 or can form the rotationally fixed part of the nozzle bearing 38 (as in FIG. 4). In this way, a rotary feedthrough 24 is created with which brake abrasion from the rotating discharge area 15 of the measuring rim 1 can be discharged via the discharge nozzle 37 that is rotationally fixed in relation to the measuring rim 1. Of course, such a rotary feedthrough 24 can also be designed in any other way. In particular, the discharge nozzle 37 does not necessarily have to rest axially on the collecting disk 27.

Figure 5:
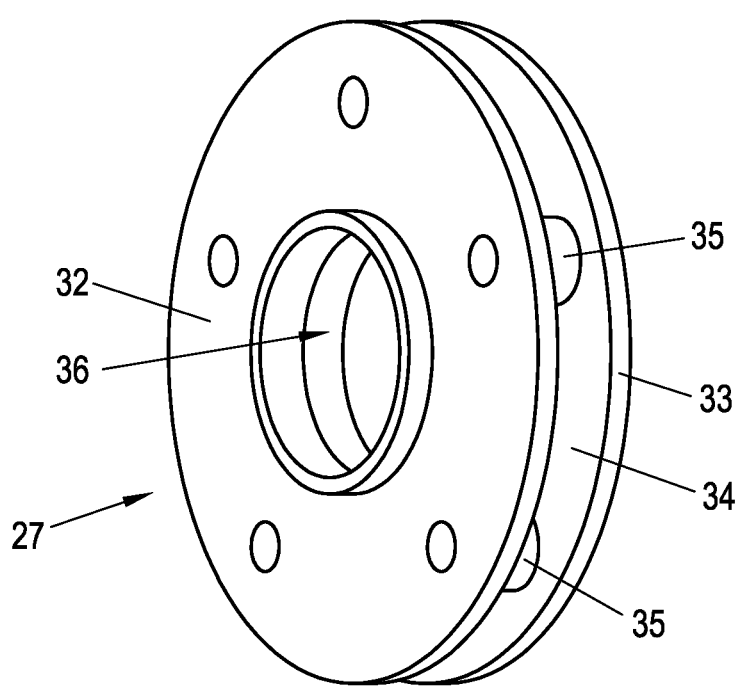
FIGS. 4 to 6 show a first embodiment of a measuring rim according to the invention.
Figure 7:
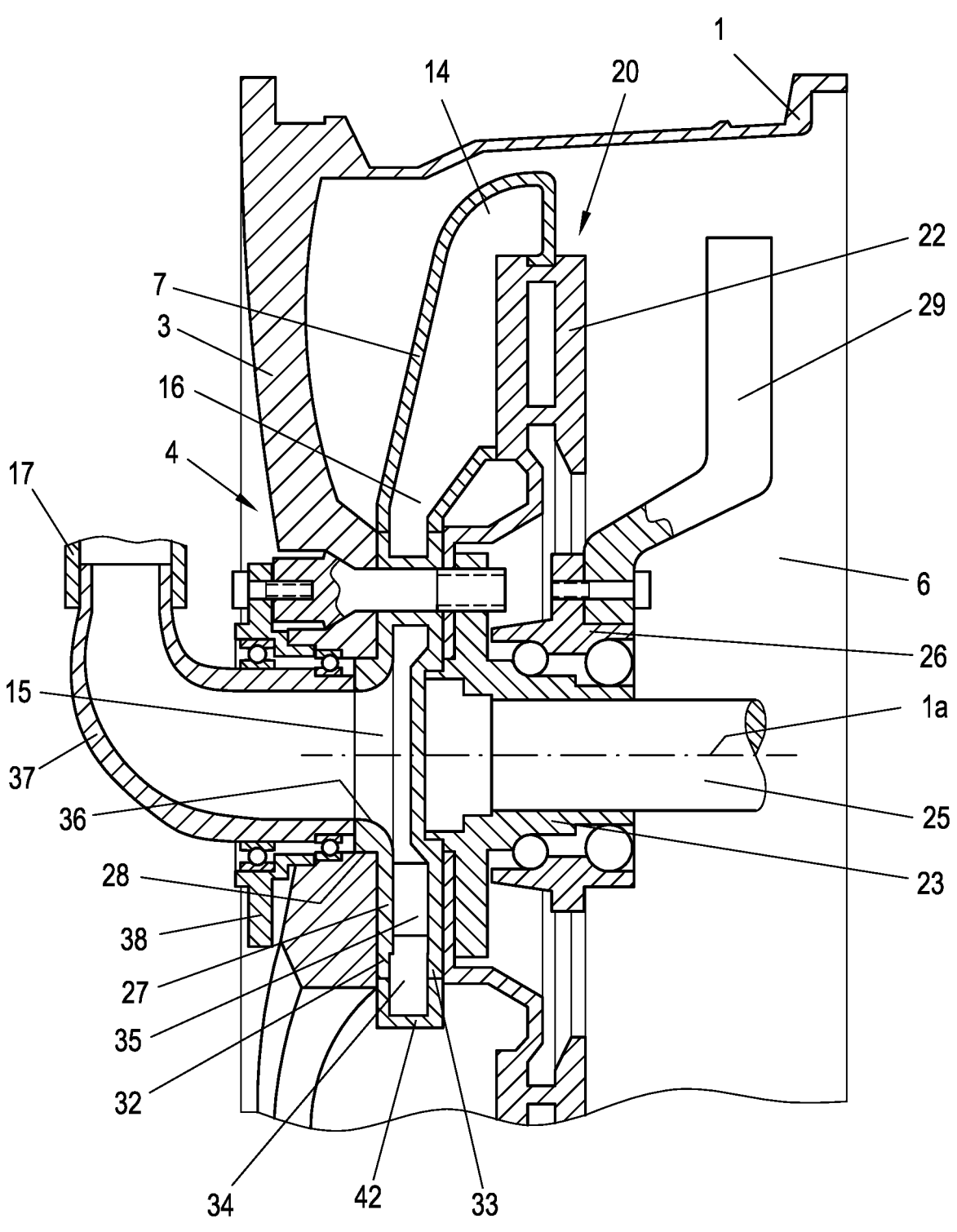
FIG. 7 shows an embodiment in which the collecting housing surrounds a brake disk only on one side.

FIG. 7 shows a variant of the measuring rim 1 according to FIGS. 4 to 6 with a collecting housing 7 which at least partially surrounds the movable brake part—here the brake disk 22—on only one side. Otherwise, the embodiment is as described above.

Figure 8:
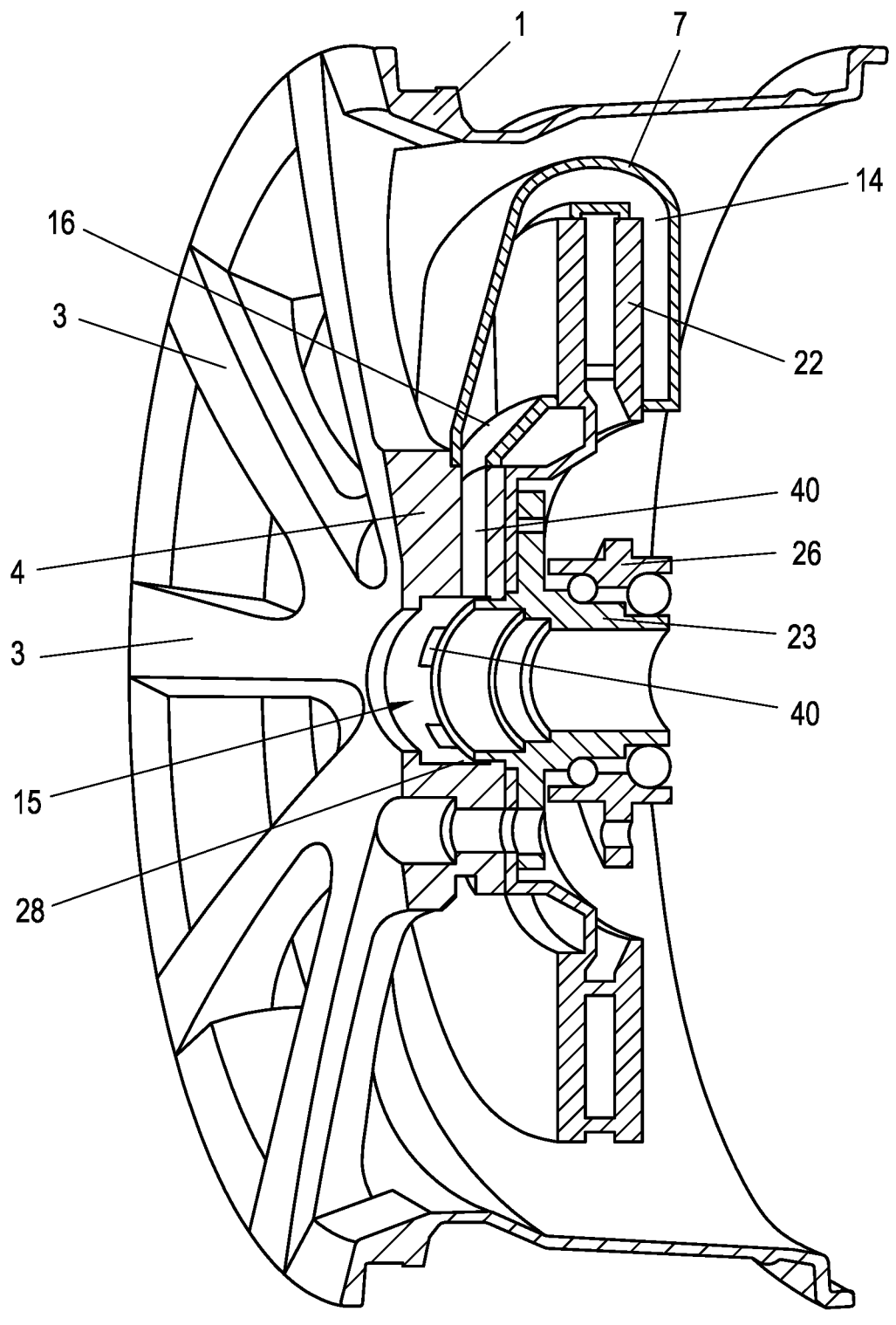

In FIG. 8, a further embodiment of a measuring rim 1 according to the invention is described. In this exemplary embodiment, the central recess 28 of the measuring rim 1 functions as a discharge area 15 for removing the brake abrasion. To this end, a number of radial recesses 40 distributed over the circumference are provided on the rim flange 4, which the central recess 28 connects with the radially outer circumferential surface of the rim flange 4 in the region of the rim interior 6. The at least one radial recess 40 opens out at the radially outer circumferential surface into the region of the rim flange 4, which projects into the rim interior 6. The radial recess 40 opens out radially inwardly into the central recess 28. The collecting housing 7 with the collecting channel 16 is again arranged such as to be rotationally fixed in the measuring rim 1. The collecting channel 16 ends on the outer circumferential surface of the rim flange 4 in the region of the openings of the number of radial recesses 40 and thus connects the collecting housing interior 14 with the at least one recess 40 opening into the outer circumferential surface of the rim flange 4. A circumferential groove could also be provided on the outer circumferential surface of the rim flange 4, into which the collecting channel 16 and the radial recesses 40 open out. However, the collecting channel 16 can also extend in the circumferential direction around the rim flange 4, as in FIG. 7.

In the embodiment according to FIG. 8, the collecting channel 16 extends in the circumferential direction across a predetermined length of the extension of the collecting housing 7 in the circumferential direction, as shown in FIG. 9. Similarly, in an embodiment according to FIG. 4 or FIG. 7 the collecting channel 16 can extend in the circumferential direction. A recess 41 is provided on the radially inner circumferential surface 43 of the collecting channel 16, via which the collecting channel 16 is connected with the circumferential surface of the rim flange 4. A closing ring 42 can extend across the remaining circumference and adjoining the inner circumferential surface 43 of the collecting channel 16, which closing ring 42 rests against the outer circumferential surface of the rim flange 4 and closes the radial recesses 40 to the outside in this region. Similarly, such a closing ring 42 can also be provided in an embodiment according to FIG. 4 or FIG. 7. This closing ring 42 could be designed with a U-shaped cross section, as in FIG. 4 or 7. A circumferential groove on the outer circumferential surface of the rim flange 4 or a closing ring 42 with a U-shaped cross section can improve the discharge of the brake abrasion and, in particular, reduce a loss of brake abrasion.

The brake abrasion can therefore be discharged via the collecting channel 16, the radial recesses 40 and the central recess 28. For this purpose, a suitable rotary feedthrough can be provided on the central recess, for example as described above.

In the embodiment according to FIG. 8 it is also possible for the collecting housing 7 to be put only over one side of the movable brake part (here the brake disk 22) (as in FIG. 7). In the embodiment according to FIG. 8, it is also possible to arrange a discharge nozzle 37, as described in connection with FIG. 4, in the central recess 28.

Figure 10:
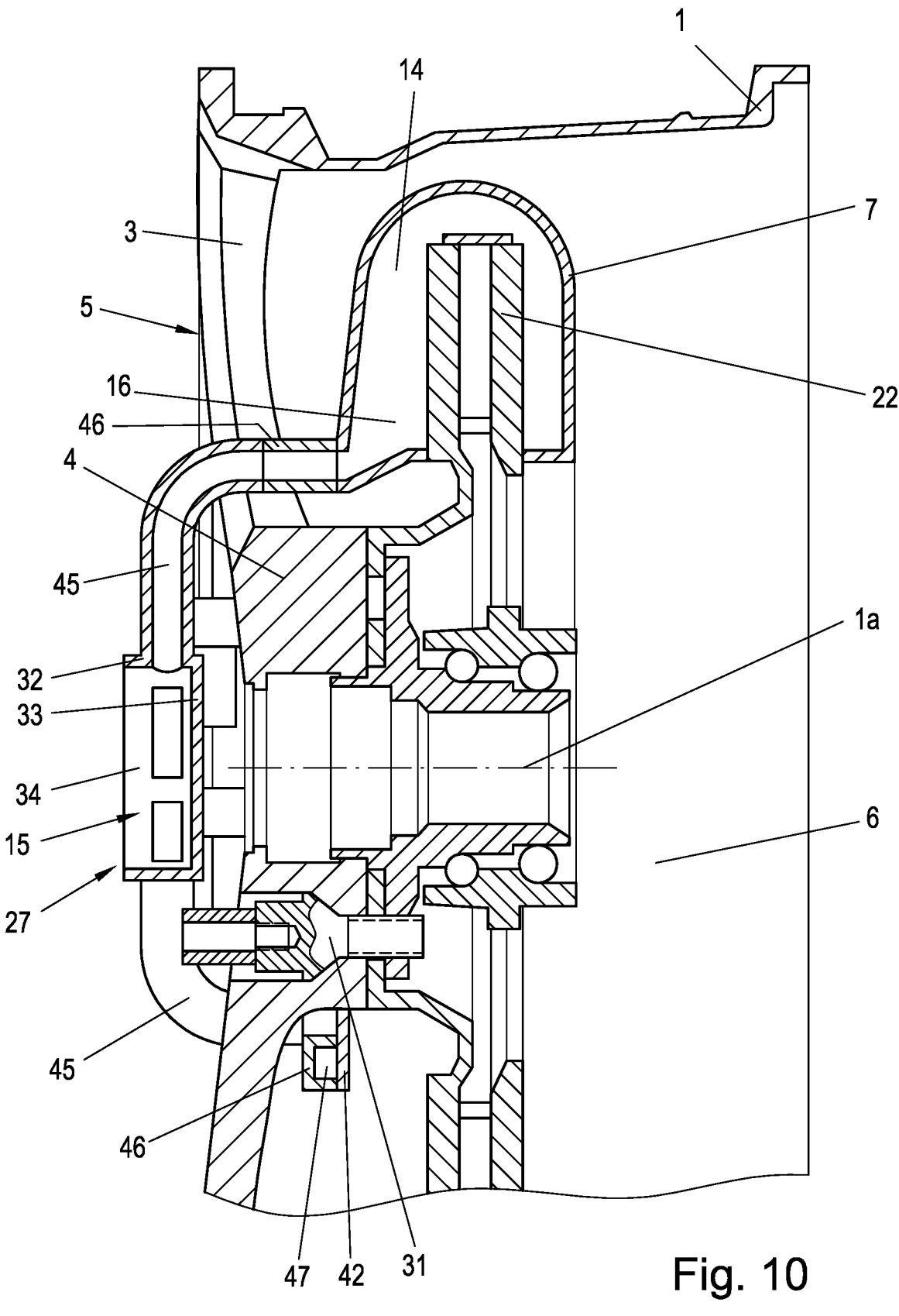
FIGS. 10 to 12 show a further embodiment of a measuring rim according to the invention.
Figure 11:
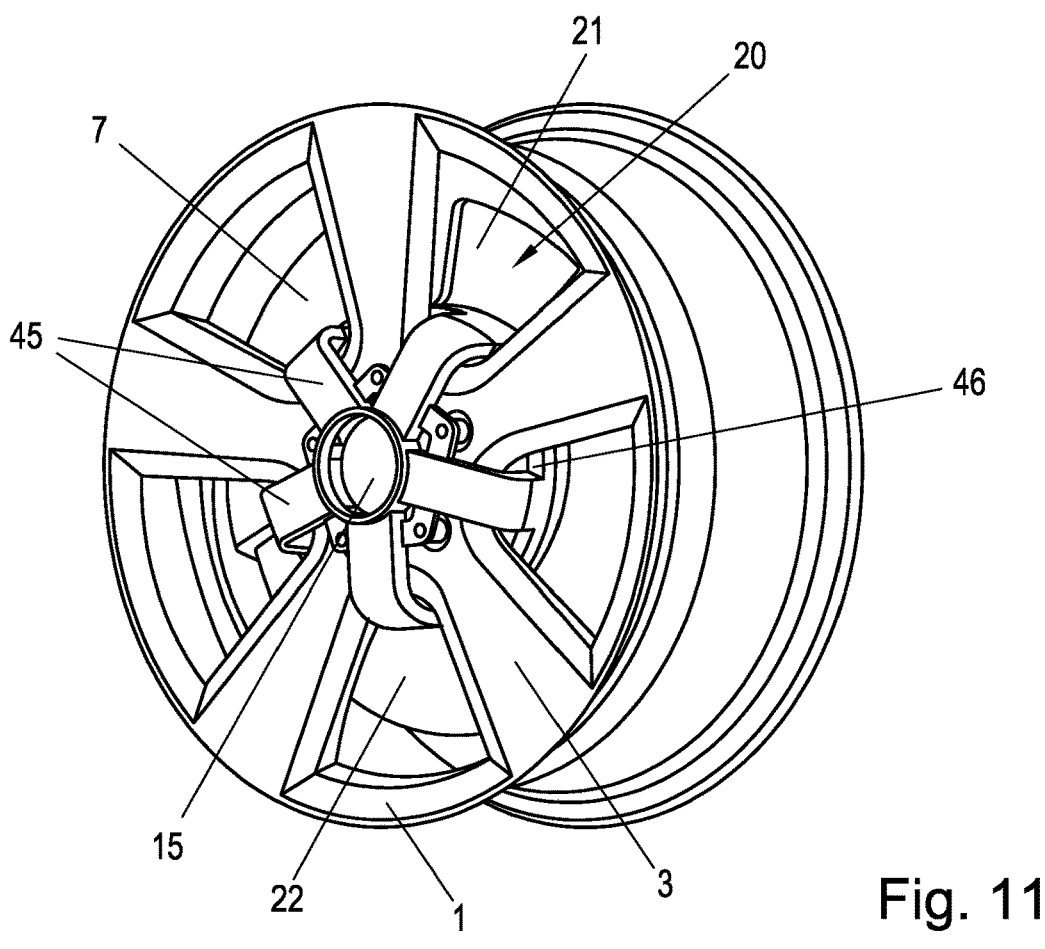
Figure 12:
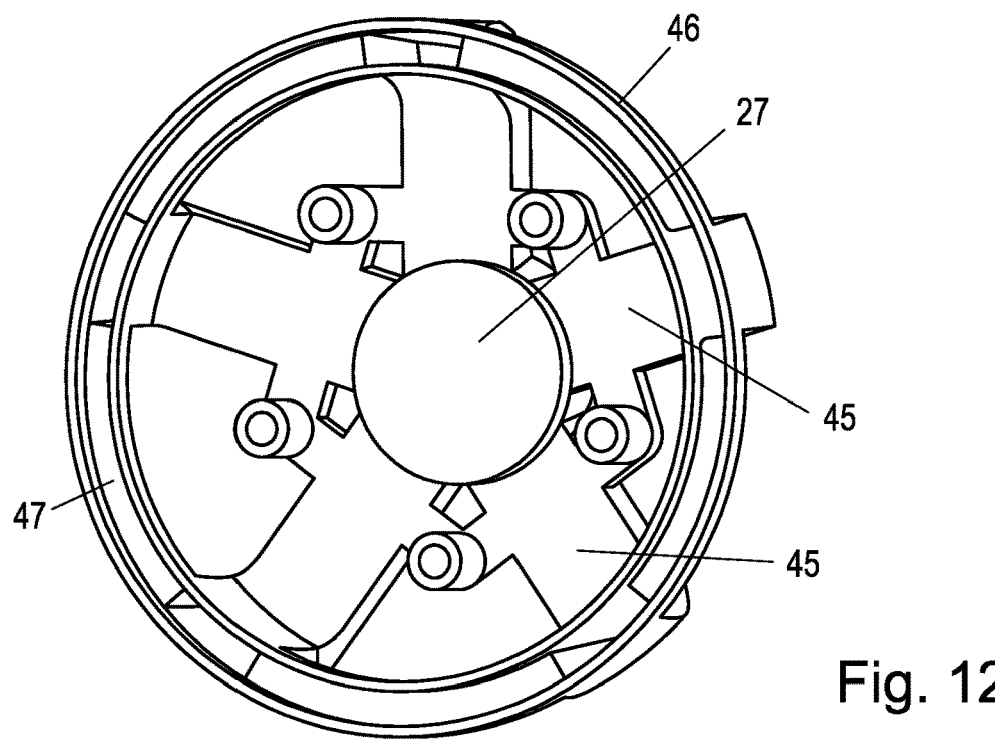

FIGS. 10 to 12 describe a further embodiment of a measuring rim 1 according to the invention. In this embodiment, a collecting disk 27 is used again which, however, is not arranged inside the rim interior 6 but on the outside of the rim end face 5 of the measuring rim 1. In this embodiment too, a standard rim which does not require any modifications can be used.

The collecting disk 27 has a first collecting disk plate 32 with a centrally inwardly positioned recess 36. A second collecting disk plate 33 is arranged such as to be axially spaced apart from the first collecting disk plate 32. A cavity 34 is thus formed again between the first collecting disk plate 32 and the second collecting disk plate 33, which cavity 34 functions as a discharge area 15. The collecting disk 27 is arranged on the outer rim end face 5 of the measuring rim 1, for example with suitable screw connections, and rotates with the measuring rim 1.

In FIG. 10, the collecting housing 7 with the collecting channel 16 is again put on both sides, or only on one side, partially over the movable brake part, here a brake disk 22. The collecting channel 16 is connected to the cavity 34 of the collecting disk 27 via at least one connecting channel 45. The connecting channel 45 and the collecting disk 27 can be designed as one piece. The connecting channel 45 can open out into the radially outer circumferential surface of the collecting disk 27 (as in FIGS. 10 to 12), wherein the latter is at least partially open in the opening region. However, the connecting channel 45 can open into the cavity 34 also via the first or second collecting disk plate 32, 33. Combinations are also conceivable.

In an advantageous embodiment, as shown in FIGS. 10 to 12, a connecting ring 46 is provided in which an end-face circumferential groove 47 is formed, so that the connecting ring 46 has a U-shaped cross section and is at least partially open on one side on one end face. A number of connecting channels 45 arranged such as to be distributed over the circumference open out into the circumferential groove 47 of the connecting ring 46. The circumferential groove 47 is thus connected to the cavity 34 of the collecting disk 27. The connecting ring 46 is arranged such as to face the collecting channel 16 with its open end face, so that the collecting channel 16 opens out into the circumferential groove 47 over the length of its extension in the circumferential direction. A closing ring 42 can extend across the remaining circumference, which closes the circumferential groove 47 to the outside. This end ring 42 could also be designed to have a U-shaped cross section in order to enlarge the circumferential groove 47 in the region of the closing ring 42.

Of course, the embodiment with at least one connecting channel 45 and one connecting ring 46 can also be used in an embodiment of the measuring rim 1 according to FIG. 4 or FIG. 7. In this case, the connecting channel 45 and the connecting ring 46 would be arranged in the rim interior 6.

Figure 13:
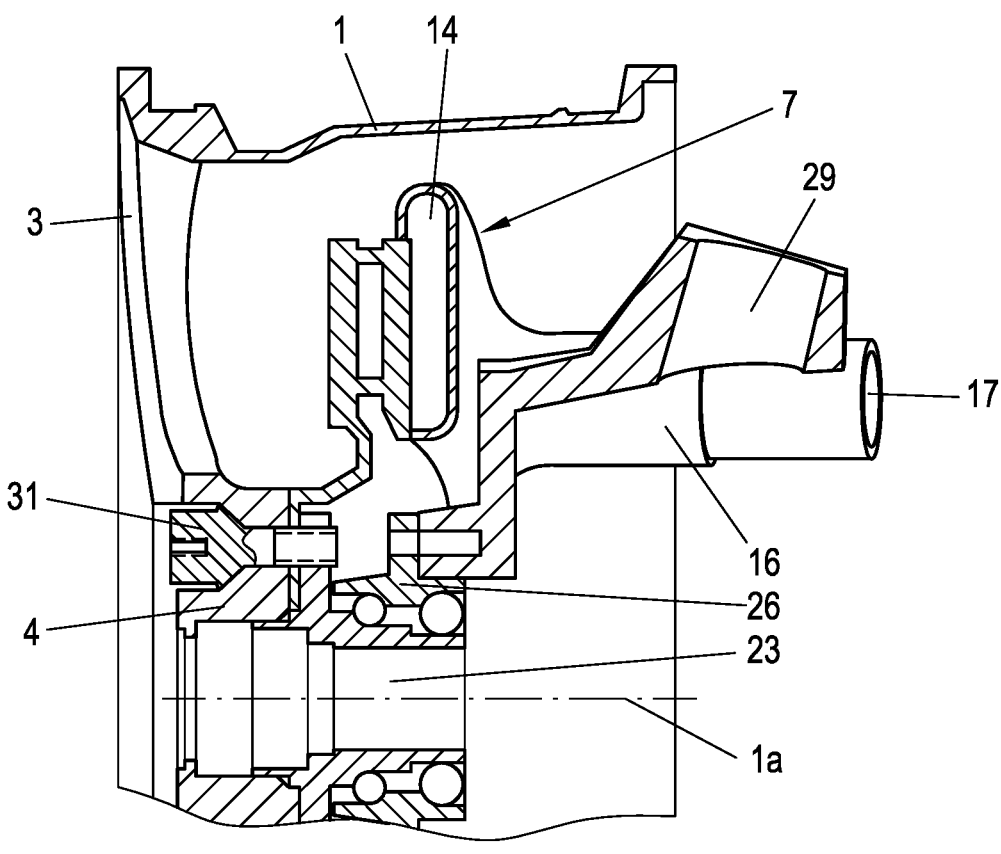
FIG. 13 shows a measuring rim according to the invention with a collecting channel in the rim interior for discharging via a wheel well of a vehicle and FIG. 14 shows a measuring rim with a particle filter in a central recess of the measuring rim for collecting the brake abrasion.

Instead of discharging the brake abrasion to the outside via the measuring rim 1 as shown in FIGS. 1 to 12, it is also possible to provide for discharging the brake abrasion to the inside via the rim interior 6 and a wheel well of the vehicle, as shown in FIG. 13. The advantage of this embodiment is that no rotary feedthrough would be required for discharging the brake abrasion. However, there is often little space in the region of the wheel well, so that such an embodiment cannot be implemented in certain vehicles due to the lack of space.

The collecting housing 7, with the collecting channel 16, arranged in a rotationally fixed manner in the rim interior 6 is again put on both sides or only on one side (as in FIG. 13) partially over the movable brake part, here a brake disk 22. The collecting channel 16 is arranged such as to be facing away from the side of the measuring rim 1 with the spokes 3 and thus points in the direction of a wheel well of a vehicle. A discharge line 17 for discharging the collected brake abrasion from the collecting housing 7 can be easily connected to this collecting channel 16. The collecting channel 16 simultaneously functions as a discharge area 15.

Figure 14:
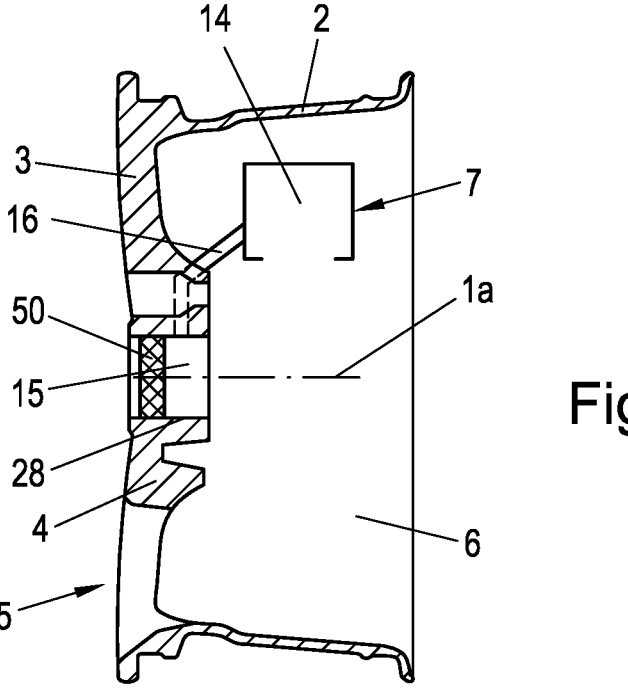

In all embodiments described above, the discharge area 15 is followed by a discharge line 17 via which brake abrasion is discharged and supplied to a measuring device 19. In an alternative embodiment, a filter insert 50 as shown in FIG. 14 could be provided in the discharge area 15 or in a central recess 28 of the measuring rim 1 connected with the discharge area 15, in which brake abrasion is filtered out of an aerosol flowing through and is collected in the filter insert 50. The filter insert 50 can thus be removed after a test drive, and the brake abrasion collected in the filter insert 50 can be analyzed. In this case, the brake abrasion would not be analyzed online during the test drive, but offline after the test drive. An embodiment of the measuring rim 1 is advantageously used for this purpose in which the central recess 28 functions as a discharge area 15 (e.g., as shown in FIG. 8). However, the brake abrasion can be supplied to the central recess 28 also, for example, with an embodiment of the collecting housing 7 and the collecting channel 16 according to FIG. 4 or FIG. 7 (without the discharge nozzle 37) or according to FIG. 8.

It is obvious that an air gap is advantageously provided between moving and rotationally fixed components in order to avoid friction and wear. Such an air gap is provided, for example, between a collecting disk 27 and a collecting channel 16 or a closing ring 42. Similarly, an air gap between a moving brake part, for example a brake disk 22, and the collecting housing 7 is advantageous. Such an air gap can also vary to improve the discharge of the brake abrasion and to prevent brake particles from being lost. Of course, the air gap is designed such that a loss of brake particles is minimized.

With the solution according to the invention in the described variants, brake particles can be classified and characterized without resulting in disruptive changes in the temperature or flow conditions in the region of the brake system during collection. An application is possible virtually without or only with minimal adaptations of a standard rim, so that cost-effective use is possible with little effort.

The invention claimed is:

1. A measuring rim, comprising:
a rim circumferential surface which is connected at least on one rim end face of the measuring rim via one or more spokes to a centrally inwardly positioned rim flange, wherein a rim interior is formed between the rim circumferential surface, the spokes and the rim flange;
a collecting housing, which extends in the circumferential direction of the measuring rim over an extension angle, wherein the collecting housing is arranged in the rim interior;
a collecting housing interior formed in the collecting housing, wherein the collecting housing is at least partly open towards the collecting housing interior on a radially inner circumferential surface extending in the circumferential direction of the measuring rim;
a discharge area provided on the rim flange on the measuring rim; and
a collecting channel which connects the collecting housing interior of the collecting housing to the discharge area, wherein the collecting channel is provided on the measuring rim.

2. The measuring rim according to claim 1, wherein the extension angle is between 100° and 180°.

3. The measuring rim according to claim 1, wherein an end of the collecting channel facing away from the collecting housing interior extends for a predetermined length in the circumferential direction of the collecting housing.

4. The measuring rim according to claim 1, wherein a central recess which forms the discharge area is provided centrally on the inside of the rim flange.

5. The measuring rim according to claim 4, wherein at least one radial recess is provided on the rim flange, which connects the rim interior to the central recess, wherein the radial recess on the radially outer circumferential surface of the rim flange opens out into the region of the rim flange, which projects into the rim interior, and opens out radially inside the central recess, and wherein the collecting channel ends on the outer circumferential surface of the rim flange in the region of the opening of the at least one radial recess in order to connect the discharge area to the collecting housing interior.

6. The measuring rim according to claim 4, wherein a hollow discharge nozzle is rotatably mounted in the central recess as a rotary feedthrough.

7. The measuring rim according to claim 1, wherein a collecting disk is arranged on an axial end of the rim flange, which axial end lies in the rim interior, or on the outside of the rim end face, in which collecting disk a cavity is provided and the cavity forms the discharge area in that the cavity is connected to the collecting channel.

8. The measuring rim according to claim 7, wherein at least one opening towards the cavity is provided on the collecting disk on a surface selected from the group consisting of a radially outer circumferential surface and an end face, and wherein the collecting channel ends in the region of the at least one opening in order to connect the cavity to the collecting housing interior.

9. The measuring rim according to claim 7 wherein the collecting disk has a first collecting disk plate and a second collecting disk plate, which are arranged axially spaced apart from one another to form the cavity, and a centrally inwardly positioned recess is provided on the first collecting disk plate, which recess is connected to the cavity.

10. The measuring rim according to claim 9, wherein the recess of the first collecting disk plate is arranged in the central recess of the measuring rim.

11. The measuring rim according to claim 7, wherein at least one connecting channel is arranged on the collecting disk, which connecting channel is connected to the cavity and opens out into a circumferential groove of a connecting ring, and wherein the collecting channel ends in the region of the circumferential groove in order to connect the cavity to the collecting housing interior via the connecting channel and the connecting ring.

12. The measuring rim according to claim 1, wherein a rotary feedthrough is provided on the measuring rim which is connected to the discharge area.

13. A system for detecting the brake abrasion of a brake device of a vehicle wheel, wherein the vehicle wheel has a measuring rim according to claim 1 and the collecting housing of the measuring rim at least partly surrounds a movable brake part of the brake device, wherein the movable brake part projects into the collecting housing interior.

14. The system according to claim 13, wherein the brake abrasion is guided out of the discharge area via a discharge line to a measuring device.

15. The system according to claim 13, wherein a filter insert in which brake abrasion is collected is arranged in the discharge area or in a central recess connected to the discharge area.

16. The measuring rim according to claim 1, wherein the extension angle is between 100° and 130°.

\* \* \* \* \*